United States Patent
Inagaki et al.

(10) Patent No.: US 6,794,079 B2
(45) Date of Patent: Sep. 21, 2004

(54) FUEL CELL

(75) Inventors: Toshiyuki Inagaki, Toyota (JP); Mikio Wada, Aichi-ken (JP); Yuichi Yagami, Toyota (JP); Tsuyoshi Takahashi, Aichi-ken (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 291 days.

(21) Appl. No.: 10/171,544

(22) Filed: Jun. 17, 2002

(65) Prior Publication Data

US 2002/0192532 A1 Dec. 19, 2002

(51) Int. Cl.[7] .............................................. H01M 8/04
(52) U.S. Cl. .............................. 429/39; 429/36; 429/38
(58) Field of Search ............................... 429/39, 36, 38

(56) References Cited

U.S. PATENT DOCUMENTS

| | | | |
|---|---|---|---|
| 4,590,135 A | * 5/1986 | Warszawski et al. | 429/38 |
| 5,077,148 A | * 12/1991 | Schora et al. | 429/16 |
| 6,255,011 B1 | * 7/2001 | Fujii et al. | 429/32 |
| 6,350,540 B1 | * 2/2002 | Sugita et al. | 429/39 |

FOREIGN PATENT DOCUMENTS

| | | |
|---|---|---|
| JP | 10-074530 | 3/1998 |
| JP | 2000-12053 | 1/2000 |
| WO | WO96/37920 | 11/1996 |

\* cited by examiner

Primary Examiner—John S. Maples
(74) Attorney, Agent, or Firm—Kenyon & Kenyon

(57) ABSTRACT

A fuel cell includes a separator including a first member made from metal and a second member made from synthetic resin. The separator has a power generating portion corresponding portion including a gas passage portion and opposing portions located on opposite sides of the power generating portion corresponding portion. A manifold portion is formed in the opposing portions. The manifold portion is offset from the gas passage portion. A gas passage connecting portion is formed in the second member and fluidly connects the manifold portion and the gas passage portion. A gas flow adjusting portion is formed for directing a direction of a gas flow at the gas passage connecting portion to a direction perpendicular to a direction connecting the opposing portions and making a gas flow into and from the gas passage portion uniform in the direction perpendicular to a direction connecting the opposing portions.

9 Claims, 5 Drawing Sheets

FUEL CELL

BACKGROUND OF THE INVENTION

1. Field of the Invention

The present invention relates to a fuel cell. More particularly, the present invention relates to a separator structure of the fuel cell.

2. Description of Related Art

A PEFC (Polymer Electrolyte Fuel Cell) apparatus includes individual fuel cells. Each fuel cell includes a membrane-electrode assembly (MEA) and a separator. The MEA includes an electrolyte membrane and a pair of electrodes disposed on opposite sides of the electrolyte membrane. The pair of electrodes includes an anode provided on one side of the membrane and constructed of a first catalyst layer and a cathode provided on the other side of the membrane and constructed of a second catalyst layer. A first diffusion layer may be provided between the first catalyst layer and a first separator and a second diffusion layer may be provided between the second catalyst layer and a second separator. The first separator has a passage formed therein for supplying fuel gas (hydrogen) to the anode and the second separator has a passage formed therein for oxidant gas (oxygen, usually, air) to the cathode. A plurality of fuel cells are layered to construct a module. A number of modules are piled, and electrical terminals, electrical insulators, and end plates are disposed at opposite ends of the pile of modules to construct a stack of fuel cells. After tightening the stack of fuel cells between the opposite end plates in a fuel cell stacking direction, the end plates are coupled to a fastening member (for example, a tension plate) extending in a fuel cell stacking direction outside the pile of fuel cells by bolts extending perpendicularly to the fuel cell stacking direction.

In the PEFC, at the anode, hydrogen is changed to positively charged hydrogen ions (i.e., protons) and electrons. The hydrogen ions move through the electrolyte membrane to the cathode where the hydrogen ions react with oxygen supplied and electrons (which are generated at an anode of the adjacent MEA and move to the cathode of the instant MEA through a separator) to form water as follows:

At the anode: 
At the cathode: 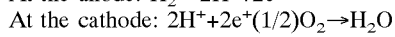

To cool the fuel cells, the temperature of which rises due to the heat generated at the water production reaction and a Joulean heat, a cooling water passage is formed at every cell or at every module and a cooling water is caused to flow in the cooling water passage.

International Patent Publication No. WO 96/37920 discloses, at FIG. 11 of the Publication, a fuel cell apparatus constructed of a number of fuel cells layered each including a pair of separators and an MEA sandwiched between the pair of separators. The separator includes a first member and a second member. The second member has a perforation at a portion thereof corresponding to a power generating portion of the fuel cell. The first member has a gas passage portion at a portion thereof corresponding to the power generating portion of the fuel cell. A manifold portion is formed in the first member and the second member, and the manifold portion is offset from the gas passage portion.

However, with the conventional fuel cell, there is the following problem:

Since a reactant gas is supplied to the gas passage portion from the manifold portion offset from the gas passage portion, the gas cannot be supplied uniformly to the gas passage portion. As a result, a high power output cannot be expected at a portion of the gas passage portion where an insufficient amount of gas is supplied, and the fuel cell cannot be operated efficiently.

SUMMARY OF THE INVENTION

An object of the present invention is to provide a fuel cell where a reactant gas can be supplied uniformly to a gas passage portion from a manifold portion despite that the manifold portion is offset from the gas passage portion.

BRIEF DESCRIPTION OF THE DRAWINGS

The above and other objects, features, and advantages of the present invention will become apparent and will be more readily appreciated from the following detailed description of the preferred embodiments of the present invention in conjunction with the accompanying drawing, in which.

DETAILED DESCRIPTION OF THE PREFERRED EMBODIMENTS

A fuel cell according to the present invention will be explained with reference to FIGS. 1–8.

A fuel cell 10 according to the present invention is of a polymer electrolyte fuel cell (hereinafter, PEFC)-type. The fuel cell 10 is mounted to, for example, a vehicle. However, the fuel cell 10 may be used for other than a vehicle.

Figure 1:
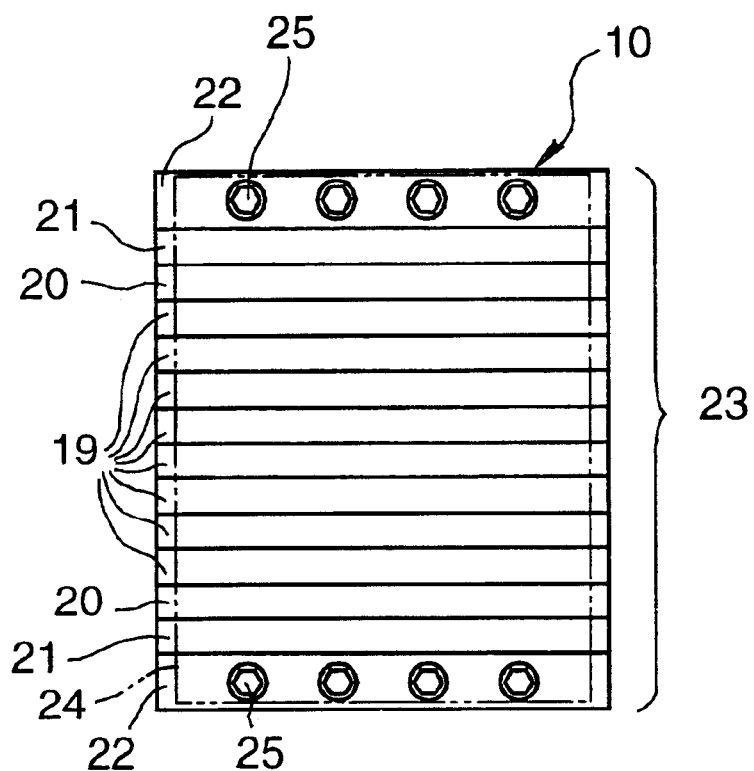
FIG. 1 is an elevational view of a stack of fuel cells according to the present invention.
Figure 2:
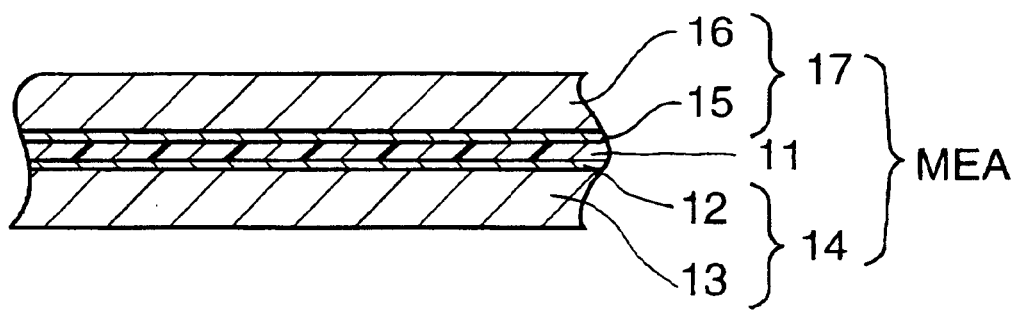
FIG. 2 is a cross-sectional view of an MEA of the fuel cell according to the present invention.
Figure 3:
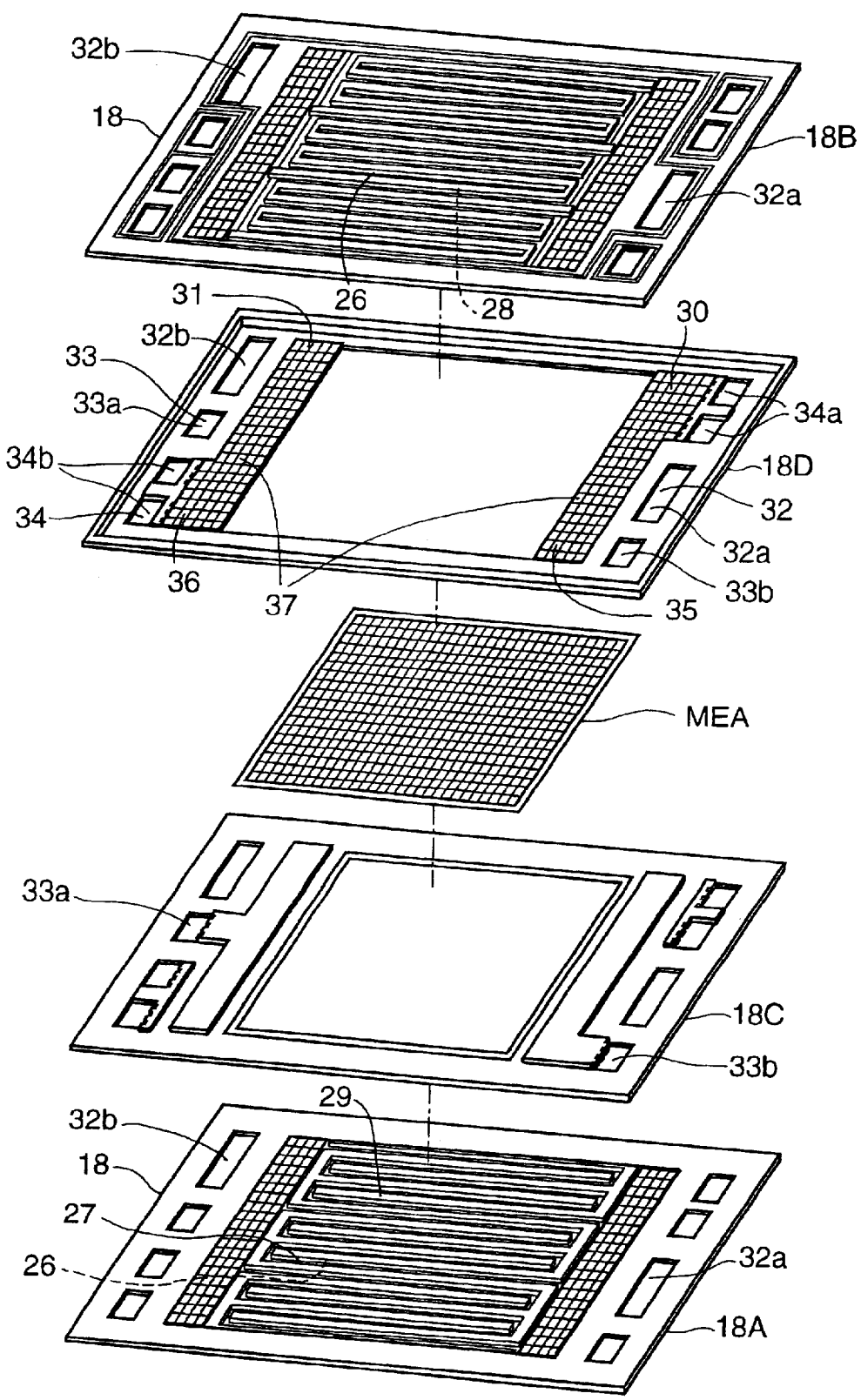
FIG. 3 is a perspective view, shown in a decomposed state, of the fuel cell according to the present invention.

As illustrated in FIGS. 1–3, the PEFC 10 includes a stack of individual fuel cells 23. Each fuel cell includes a membrane-electrode assembly (MEA) and a separator 18. The MEA includes an electrolyte membrane 11 and a pair of electrodes disposed on opposite sides of the membrane 11. The pair of electrodes include (a) an anode 14 provided on one side of the membrane and including a first catalyst layer 12 and (b) a cathode 17 provided on the other side of the membrane and including a second catalyst layer 15. A first diffusion layer 13 may be disposed between the first catalyst layer 12 and a separator 18A provided on an anode side of the MEA, and a second diffusion layer 16 may be disposed between the second catalyst layer 15 and a separator 18B provided on a cathode side of the MEA. The separator 18A includes a fuel gas (hydrogen) passage 27 formed at a first, MEA-opposing surface and a coolant (cooling water) passage 26 formed at a second, opposite surface. The separator 18B includes an oxidant gas (oxygen, usually, air) passage 28 formed at a first, MEA-opposing surface and a coolant (cooling water) passage 26 formed at a second, opposite surface. At least one fuel cell constructs a module 19, and a number of modules are piled, and electrical terminals 20, electrical insulators 21, and end plates 22 are disposed at opposite ends of the pile of modules to construct the stack of fuel cells 23. After tightening the stack of fuel cells 23 between the end plates 22 in a fuel cell stacking direction, the end plates 22 are coupled to the fastening member 24 (for example, a tension plate) extending in the fuel stacking direction outside the pile of fuel cells by bolts 25 or nuts.

The coolant passage 26 is provided at every fuel cell or at every module.

The catalyst layers 12 and 15 include platinum (Pt), carbon (C), and electrolyte. The diffusion layers 13 and 16 include carbon (C) and have a gas-permeability.

The separator 18 of the fuel cell includes the first member 18A, 18B and the second member 18C, 18D. The first member and the second member are made separately from each other. The second member 18C, 18D has a perforation (hole) at a portion 29 of the separator 18 corresponding to a power generating portion of the fuel cell (where the MEA exists and the reactant gas is supplied to generate an electric power) and is made in the form of a frame.

The first member 18A and the second member 18C are disposed on the anode side of the MEA, and the first member 18A separates fuel gas (hydrogen) from cooling water. The first member 18B and the second member 18D are disposed on the cathode side of the MEA, and the first member 18B separates oxidant gas (air) from cooling water.

The first member 18A, 18B of the separator 18 is made from metal and may be called as a metal separator. The second member 18C, 18D of the separator 18 is made from synthetic resin and may be called as a synthetic resin frame.

The metal separator 18A, 18B has no gas-permeability. The metal separator 18A, 18B is constructed of a metal plate (for example, a stainless steel plate) plated with metal having a good electrical conductivity (for example, nickel).

The metal separator 18A, 18B constitutes an electrical current passage through which electrons move from the anode of one fuel cell to the cathode of an adjacent fuel cell.

As illustrated in FIG. 3, the MEA is sandwiched by the separators 18. When the MEA and the separators 18 are layered, the synthetic resin frame 18C is disposed between the metal separator 18A and the MEA, and the synthetic resin frame 18D is disposed between the metal separator 18B and the MEA. As a result, at a frame existing portion of the synthetic resin frames 18C and 18D, the layering order is the order of the metal separator 18A, the synthetic resin frame 18C, the MEA, the synthetic resin frame 18D, and the metal separator B. Since the synthetic resin frames 18C and 18D have a perforation (hole) at the central portion, at the hole portion of the synthetic resin frames 18C and 18D, the MEA is directly sandwiched between the metal separators 18A and 18b. The portion where the MEA with the diffusion layers on the opposite sides of the MEA is directly sandwiched between the metal separators 18A and 18B constitutes the power generating portion of the fuel cell, and the portion of the separator 18 corresponding to the power generating portion of the fuel cell constitutes a power generating portion corresponding portion 29 of the separator 18. The separator 18 includes opposing portions 30 and 31 located on opposite sides of the power generating portion corresponding portion.

Figure 8:
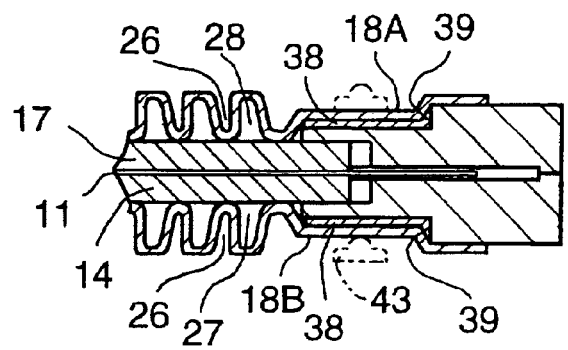
FIG. 8 is a cross-sectional view taken along D—D of FIG. 4.

As illustrated in FIG. 8, at a first, MEA opposing surface of the power generating portion corresponding portion 29 of the metal separator 18A, a gas passage portion is formed in the separator, and at the gas passage portion of the metal separator 18A a fuel gas passage 27 is formed. At a second, opposite surface of the power generating portion corresponding portion 29 of the metal separator 18A, a cooling water passage 26 is formed in the separator 18. Similarly, at a first, MEA opposing surface of the power generating portion corresponding portion 29 of the metal separator 18B, a gas passage portion is formed in the separator, and at the gas passage portion of the metal separator 18B an oxidant gas passage (air passage) 28 is formed in the separator. At a second, opposite surface of the power generating portion corresponding portion 29 of the metal separator 18B, a cooling water passage 26 is formed in the separator 18.

As illustrated in FIG. 8, the fuel gas passage 27 located on one side of the MEA of one fuel cell and the oxidant gas passage 28 located on the other side of the MEA of the same fuel cell coincide with each other in position and are separated from each other by the MEA.

The cooling water passage 26 formed in the metal separator 18A at the second, opposite surface of the metal separator 18A of one fuel cell and the cooling water passage 26 formed in the metal separator 18B at the second, opposite surface of the metal separator 18B of an adjacent fuel cell are integral with each other in the fuel cell stacking direction without being separated.

Figure 4:
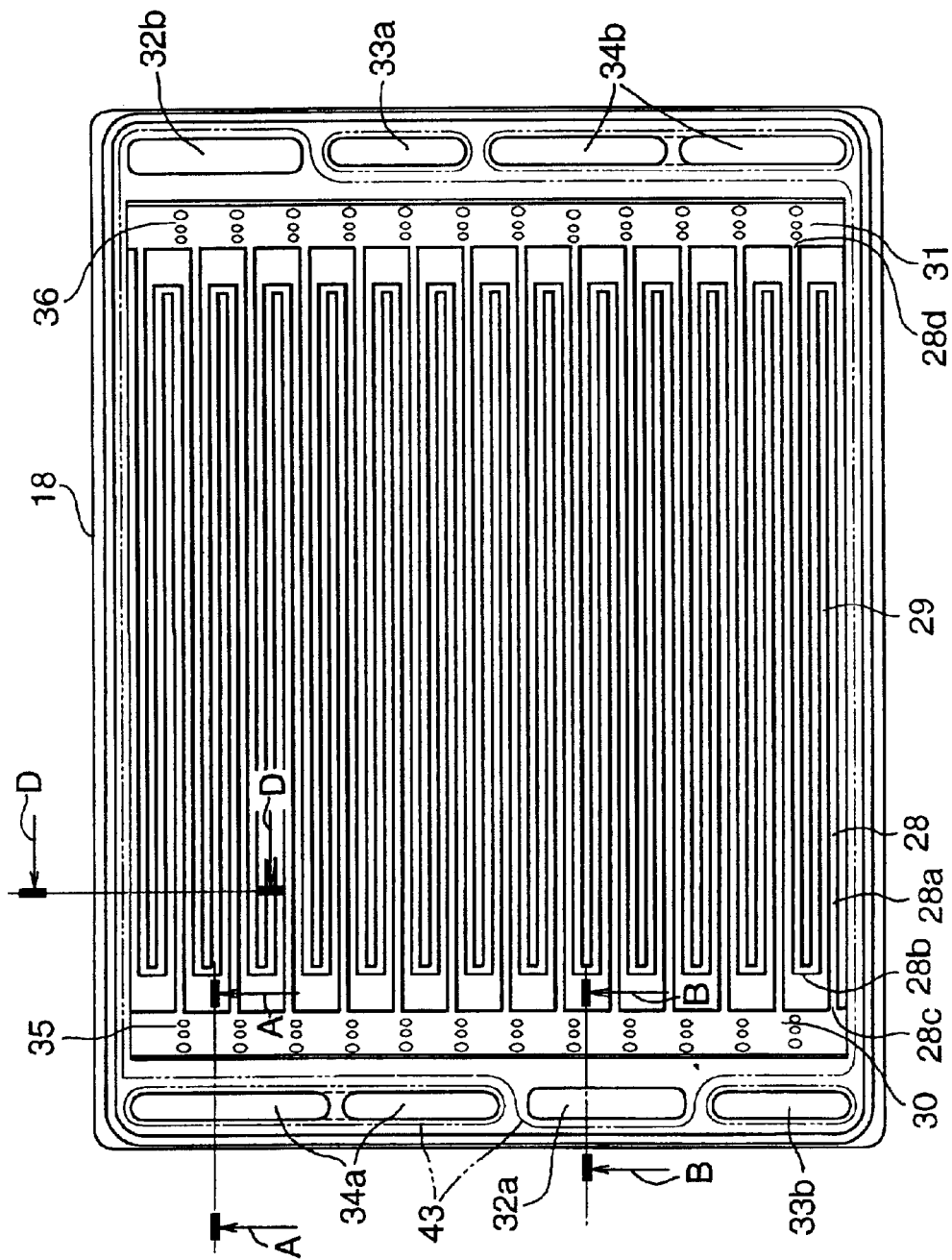
FIG. 4 is a plan view of the fuel cell according to the present invention.

As illustrated in FIG. 4, at the gas passage portion (the portion where the gas passage 27, 28 is formed) of the metal separators 18A and 18B, each of the fuel gas passage 27 and the oxidant gas passage 28 is U-turned between the opposing portions 30 and 31 located on opposite sides of the power generating portion corresponding portion 29 of the separator 18. Due to this structure, the length of the gas passage 27, 28 is long so that when the same amount of gas is supplied to the MEA, the gas flow speed becomes high. As a result, the power outlet of the fuel cell increases and a product water is unlikely to collect in the gas passage 27, 28.

More particularly, the fuel gas passage 27 extends between the opposing portions 30 and 31 by U-turning twice or more and has an odd number of straight-extending portions 27a extending parallel to each other and an even number, equal to the odd number minus one, of U-turn portions 27b. Similarly, the oxidant gas passage 28 extends between the opposing portions 30 and 31 by U-turning twice or more and has an odd number of straight-extending portions 28a extending parallel to each other and an even number, equal to the odd number minus one, of U-turn portions 28b. A plurality of fuel gas passages 27 are provided so as to be in parallel with each other. Similarly, a plurality of oxidant gas passages 28 are provided so as to be in parallel with each other.

The cooling water passage 26 formed in the separator at the second, opposite surface of the separator 18 extends straight between the opposing portions 30 and 31 of the separator 18 without U-turning. The coolant passage 26 has no U-turn portion.

An inlet 27c to the fuel gas passage 27 formed in the power generating portion corresponding portion 29 of the separator 18 and an outlet 27d from the fuel gas passage 27 formed in the power generating portion corresponding portion 29 of the separator 18 are located on opposite sides of the power generating portion corresponding portion 29 of the separator 18. Similarly, an inlet 28c to the oxidant gas passage 28 formed in the power generating portion corresponding portion 29 of the separator 18 and an outlet 28d from the oxidant gas passage 28 formed in the power generating portion corresponding portion 29 of the separator 18 are located on opposite sides of the power generating portion corresponding portion 29 of the separator 18.

The inlet 27c to the fuel gas passage 27 and the inlet 28c to the oxidant gas passage 28 are located on opposite sides of the power generating portion corresponding portion 29 of the separator 18.

Figure 5:
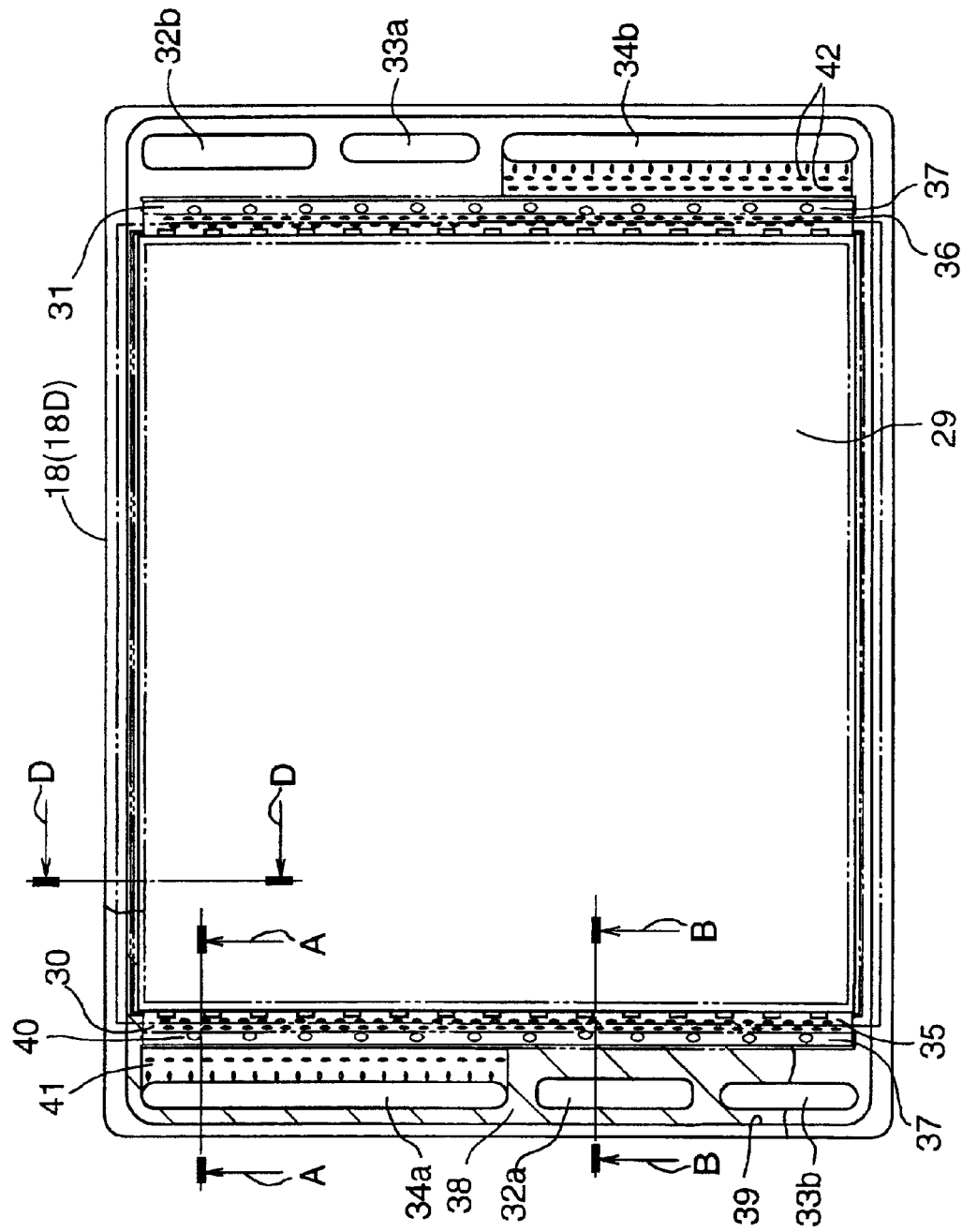
FIG. 5 is a plan view of a second member of a separator of the fuel cell according to the present invention.

As illustrated in FIG. 5, manifold portions (a portion where any one of a cooling water manifold, a fuel gas manifold, and an oxidant gas manifold is formed) are formed in the opposing portions 30 and 31 of the metal separators 18A and 18B and the synthetic resin frames 18C and 18D located on opposite side of the power generating portion corresponding portion 29 of the separator 18. In the manifold portions, a cooling water manifold 32, a fuel gas manifold 33, and an oxidant gas manifold 34 are formed.

The cooling water manifold 32 includes an inlet side cooling water manifold 32a and an outlet side cooling water manifold 32b. The fuel gas manifold 33 includes an inlet side fuel gas manifold 33a and an outlet side fuel gas manifold 33b. The oxidant gas manifold 34 includes an inlet side oxidant gas manifold 34a and an outlet side oxidant gas manifold 34b. In one of the opposing portions 30 and 31, the inlet side cooling water manifold 32a, the outlet side fuel gas manifold 33b, and the inlet side oxidant gas manifold 34a are provided, and in the other of the opposing portions 30 and 31, the outlet side cooling water manifold 32b, the inlet side fuel gas manifold 33a, and the outlet side oxidant gas manifold 34b are provided.

The fuel gas manifold 33 is offset from the gas passage portion where the fuel gas passage 27 is located, in a direction perpendicular to a direction connecting the opposing portions 30 and 31. A center of the fuel gas manifold 33 is offset in the direction perpendicular to a direction connecting the opposing portions 30 and 31 from a center in the direction perpendicular to a direction connecting the opposing portions 30 and 31, of the gas passage portion;

Similarly, the oxidant gas manifold 34 is offset from the gas passage portion where the oxidant gas passage 28 is located, in the direction perpendicular to a direction connecting the opposing portions 30 and 31. A center of the oxidant gas manifold 34 is offset in the direction perpendicular to a direction connecting the opposing portions 30 and 31 from a center in the direction perpendicular to a direction connecting the opposing portions 30 and 31, of the gas passage portion.

As illustrated in FIG. 5, in each of the opposing portions of the synthetic resin frame 18C, 18D (the second member of the separator 18), a gas passage connecting portion 37 for fluidly connecting the manifold portion and the gas passage portion is formed. The gas passage connecting portion extends in the direction perpendicular to a direction connecting the opposing portions 30 and 31.

In the gas passage connecting portion 37, a gas flow adjusting portion 35, 36 is formed for directing a direction of a gas flow at the gas passage connecting portion 37 to the direction perpendicular to a direction connecting the opposing portions 30 and 31 and making a gas flow into and from the gas passage portion uniform in the direction perpendicular to a direction connecting said opposing portions 30 and 31. The gas flow adjusting portion 35, 36 extends in the direction perpendicular to a direction connecting the opposing portions. The gas flow adjusting portion 35 enlarges a flow pattern of the gas from the inlet side gas manifold 33a, 34a to an entire width of the gas passage portion and causes the gas to flow uniformly into the gas passage portion. The gas flow adjusting portion 36 shrinks a flow pattern of the gas from the gas passage portion to a length of the outlet side gas manifold 33b, 34b and causes the gas to flow out into the outlet side gas manifold 33b, 34b.

The gas flow adjusting portion 35 and 36 has a similar structure to each other. More particularly, the gas flow adjusting portion 35, 36 includes a number of protrusions formed by dividing at least one continuous rib (two ribs in the embodiment of FIG. 5) extending in the direction perpendicular to a direction connecting said opposing portions 30 and 31 (in a longitudinal direction of the rib) into a plurality of short ribs located at equi-intervals. When the gas flows in the gas flow adjusting portion 35, 36, the gas flow is directed in the direction of the row of the short ribs and then the gas passes through spaces between the short ribs so that the gas flow is made uniform in the direction perpendicular to a direction connecting the opposing portions 30 and 31.

In the synthetic resin frame 18C, 18D (the second member of the separator 18), a seal portion 38 (a hatched portion in FIG. 5) is provided where an adhesive is coated for sealing between the synthetic resin frame 18C, 18D and an adjacent member (the metal separator or the adjacent synthetic resin frame) to seal the cooling water manifold 32, the fuel gas manifold 33, and the oxidant gas manifold 34 from each other.

A rubber seal 43 (shown in FIG. 4 by a two-dotted line 43) is provided between adjacent fuel cells so that the cooling water manifold 32, the fuel gas manifold 33, and the oxidant gas manifold 34 are sealed from each other.

Figure 6:
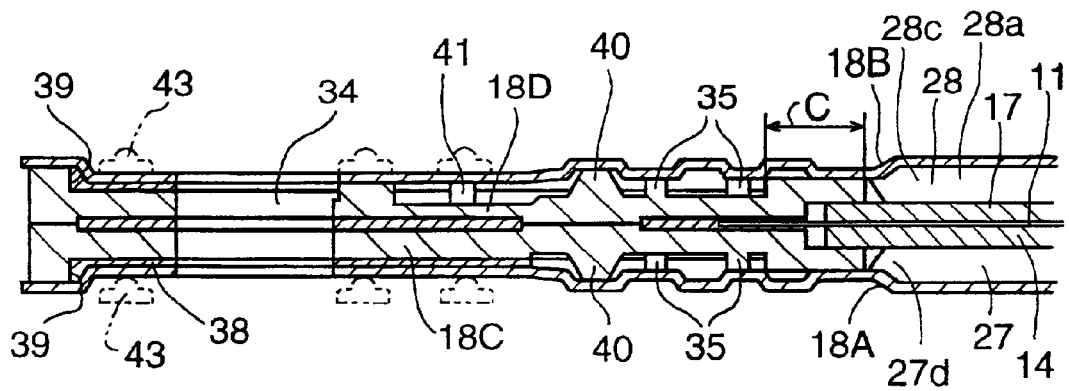
FIG. 6 is a cross-sectional view taken along A—A of FIG. 4.
Figure 7:
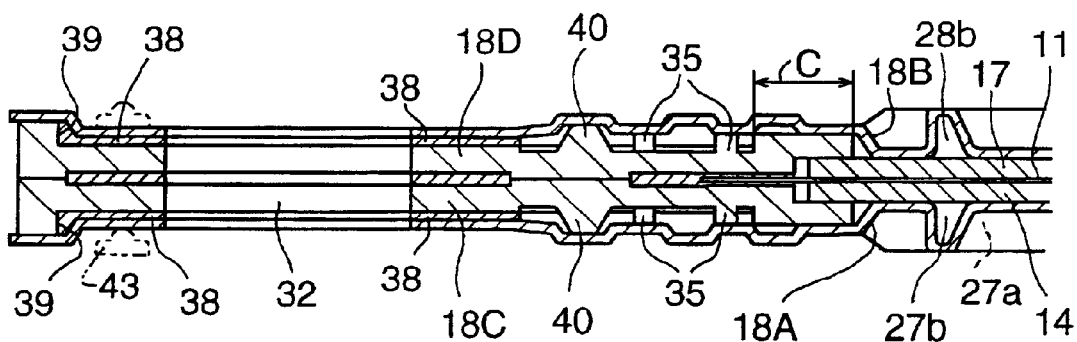
FIG. 7 is a cross-sectional view taken along B—B of FIG. 4.

As illustrated in FIGS. 6 and 7, a step 39 is formed in the synthetic resin frame 18C, 18D (the second member of the separator) for holding an adhesive to a range inside the step and for preventing the adhesive from being forced out from an adhesive coated portion to an adhesive non-coated portion, at a boundary between the adhesive coated portion and the adhesive non-coated portion which is lower than the adhesive non-coated portion.

As illustrated in FIGS. 5–7, the synthetic resin frame 18C, 18D (the second member of the separator) has a plurality of convexes 40 formed therein for maintaining a gas passage height at the gas passage connecting portion 37 constant. The convexes 40 are formed at a bottom of the gas passage connecting portion 37 and protrude toward the metal separator 18A, 18B. The convexes 40 are located between the gas flow adjusting portion 35, 36 and the manifold portion and are arranged in a row.

When the fuel cell is layered and is tightened in the fuel cell stacking direction, the convex 40 prevents the metal frame 18A, 18B from too closely approaching the synthetic resin frame 18C, 18D thereby maintaining a gas passage height of the gas passage connecting portion 37 at a normal height.

The synthetic resin frame 18C, 18D (the second member of the separator) has gas flow resisting portions 41 and 42 formed therein at the gas passage connecting portions 37 formed in the opposing portions 30 and 31 located on opposite sides of the power generating portion corresponding portion 29. The gas flow resisting portion 41 is located on a gas inlet side and the gas flow resisting portion 42 is located on a gas outlet side. A gas flow resistance of the gas flow resisting portion 42 of the gas outlet side is selected to be greater than a gas flow resistance of the gas flow resisting portion 41 of the gas inlet side. The gas flow resistance of the gas flow resisting portion 41 of the gas inlet side does not need to be provided. The gas flow resisting portion 41, 42 includes a plurality of protrusions protruding in a gas flow passage and gives a flow resistance to a gas when the gas passes between the protrusions.

Due to the gas flow resisting portion 41, 42, a pressure difference between a pressure at an inlet to the gas passage portion and a pressure at an outlet from the gas passage portion of the power generating portion corresponding portion 29 is small. As a result, a uniform distribution of gas to the gas passage portion is enhanced.

A space (distance C) between the gas flow adjusting portion 35, 36 and a periphery of the perforation (hole) of the synthetic resin frame 18C, 18D is selected to be sufficient to prevent a gas leakage from happening between the gas flow adjusting portion 35, 36 and a periphery of the perforation at portions of the periphery of the perforation except the gas inlets to and the gas outlets from the gas passage portion.

Due to the above structure, the gas flow between the gas flow adjusting portion 35, 36 and the gas passage 27, 28 formed in the gas passage portion is made uniform over the entire length of the gas flow adjusting portion 35, 36.

According to the present invention, the following technical advantages are obtained:

First, since the gas passage connecting portion 37 is formed in the second member of the separator 18 (the synthetic resin frame 18C, 18D) for fluidly connecting the manifold portion and the gas passage portion and the gas flow adjusting portion 35, 36 is formed in the gas passage connecting portion 37, the gas supplied from the manifold portion to the gas passage connecting portion 37 can be directed to a direction perpendicular to a direction connecting the opposing portions 30 and 31 and can be supplied from the gas passage connecting portion 37 to the gas passage portion uniformly in the direction perpendicular to the direction connecting the opposing portions 30 and 31, despite that the manifold portion is offset from the gas passage portion in the direction perpendicular to the direction connecting the opposing portions 30 and 31.

Second, in the case where the second member 18C, 18D of the separator is made from synthetic resin, those complicated structures such as the gas flow adjusting portion 35 and 36 made from the rib, the seal portion 38, the step 39, and the convex 40 can be formed easily.

Third, in the case where the step 39 is formed in the second member for holding an adhesive, the adhesive coated on the second member 18C, 18D for sealing between the second member and an adjacent member can be held to a range inside the step 39.

Fourth, in the case where the convex 40 is formed in the second member 18C, 18D, a gas passage height of the gas passage connecting portion 37 can be maintained at a normal height, when the fuel cells are tightened in the fuel cell stacking direction.

Fifth, in the case where the gas flow resisting portion 41, 42 is formed in the second member 18C, 18D, a pressure difference between the inlet and the outlet of the gas passage portion decreases. As a result, gas distribution to the gas passage portion is made uniform.

Sixth, in the case where a sufficient space (C) is provided between the gas flow adjusting portion 35, 36 and a periphery of the perforation of the second member, a gas leakage between the gas flow adjusting portion and the perforation of the second member can be prevented.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A fuel cell having a power generating portion, comprising:

an MEA; and a pair of separators, wherein
the MEA is sandwiched between the pair of separators,
each separator includes a first member and a second member,
each second member has a perforation at a portion thereof accomodating the power generating portion of the fuel cell,
each first member has a gas passage portion facing the power generating portion of the fuel cell,
each first member and second member has opposing portions located on opposite sides of their portion corresponding to the power generating portion of the fuel cell,
each opposing portion includes a manifold portion formed therein and offset from the gas passage portion in a direction perpendicular to a direction connecting the opposing portions, and
each second member includes a gas passage connecting portion formed therein fluidly connecting the manifold portion and the gas passage portion, wherein the gas passage connecting portion includes a gas flow adjusting portion for directing a gas flow at the gas passage connecting portion in said direction perpendicular to the direction connecting the opposing portions and making the gas flow into and from the gas passage portion uniform in said direction.

2. A fuel cell according to claim 1, wherein said first member is made from metal and said second member is made from synthetic resin.

3. A fuel cell according to claim 1, wherein an adhesive is coated on said second member for sealing between said second member and a member opposing said second member, and said second member has a step formed therein for holding said adhesive to a range inside said step.

4. A fuel cell according to claim 1, wherein said second member has a convex protrusion formed therein for maintaining a gas passage height of said gas passage connecting portion at a normal height.

5. A fuel cell according to claim 1, wherein said second member has a gas flow resisting portion formed therein at a gas passage connecting portion located at least on a gas outlet side from said gas passage portion.

6. A fuel cell according to claim 1, wherein a space is provided between said gas flow adjusting portion and a periphery of said perforation of said second member, and said space is selected to be sufficient to prevent a gas leakage from happening between said gas flow adjusting portion and said perforation of said second member.

7. A fuel cell according to claim 1, wherein said gas passage connecting portion extends in said direction perpendicular to a direction connecting said opposing portions.

8. A fuel cell according to claim 1, wherein said gas flow adjusting portion extends in said direction perpendicular to a direction connecting said opposing portions.

9. A fuel cell according to claim 1, wherein said gas flow adjusting portion includes a plurality of protrusions formed by dividing at least one continuous rib extending in said perpendicular to a direction connecting said opposing portions.

* * * * *

UNITED STATES PATENT AND TRADEMARK OFFICE
CERTIFICATE OF CORRECTION

PATENT NO.    : 6,794,079 B2
DATED         : September 21, 2004
INVENTOR(S)   : Inagaki et al.

It is certified that error appears in the above-identified patent and that said Letters Patent is hereby corrected as shown below:

Column 8,
Line 11, replace "accommodating" with -- accomodating --
Line 64, replace "extending in said perpendicular" with -- extending in said direction perpendicular --.

Signed and Sealed this

Tenth Day of May, 2005

JON W. DUDAS
*Director of the United States Patent and Trademark Office*